United States Patent [19]

Hodrien et al.

[11] Patent Number: 5,253,469
[45] Date of Patent: Oct. 19, 1993

[54] ELECTRICAL POWER GENERATION

[75] Inventors: Ronald C. Hodrien, Solihill; Keith R. Wild, Tamworth, both of United Kingdom

[73] Assignee: British Gas PLC, London, United Kingdom

[21] Appl. No.: 841,509

[22] Filed: Feb. 26, 1992

[30] Foreign Application Priority Data

Mar. 6, 1991 [GB] United Kingdom ............... 9104716

[51] Int. Cl.$^5$ ............................................. F02B 43/00
[52] U.S. Cl. ............................ 60/39.02; 60/39.12; 208/414; 48/210
[58] Field of Search ............................ 60/39.02, 39.12; 208/414, 419, 427; 48/197 R, 210

[56] References Cited

U.S. PATENT DOCUMENTS

| | | | |
|---|---|---|---|
| 3,986,349 | 10/1976 | Egan | 60/39.02 |
| 3,991,557 | 11/1976 | Danath | 60/39.12 |
| 4,277,416 | 7/1981 | Grant | 48/210 |
| 4,353,214 | 10/1982 | Gardner | 60/39.52 |
| 4,478,039 | 10/1984 | Horgan . | |
| 4,594,140 | 6/1986 | Cheng | 208/414 |
| 4,631,915 | 12/1986 | Frewer et al. | 60/39.12 |
| 4,689,139 | 8/1987 | Wurfel | 208/419 |
| 4,896,498 | 1/1990 | Knizia | 60/39.12 |

FOREIGN PATENT DOCUMENTS

| | | | |
|---|---|---|---|
| 10284853 | 10/1988 | European Pat. Off. . | |
| 0251780 | 11/1987 | Fed. Rep. of Germany | 208/419 |
| 2121426 | 12/1983 | United Kingdom . | |
| 2210105 | 6/1989 | United Kingdom . | |

Primary Examiner—Richard A. Bertsch
Assistant Examiner—Michael I. Kocharov
Attorney, Agent, or Firm—Oblon, Spivak, McClelland, Maier & Neustadt

[57] ABSTRACT

A method for combined cycle electrical power generation comprises utilizing a coal hydrogenator 1 to produce gaseous, liquid and char products. The gaseous product, an optionally the liquid product, is combusted to drive a gas turbine 4, which in turn drives a first electrical generator 5, whilst the char is fed to a boiler 9 and combusted therein to produce steam to drive a steam turbine 10 which in turn drives a second electrical generator 11. The method enables electrical power to be generated from gaseous, lqiuid and char products produced by the coal hydrogenator.

5 Claims, 1 Drawing Sheet

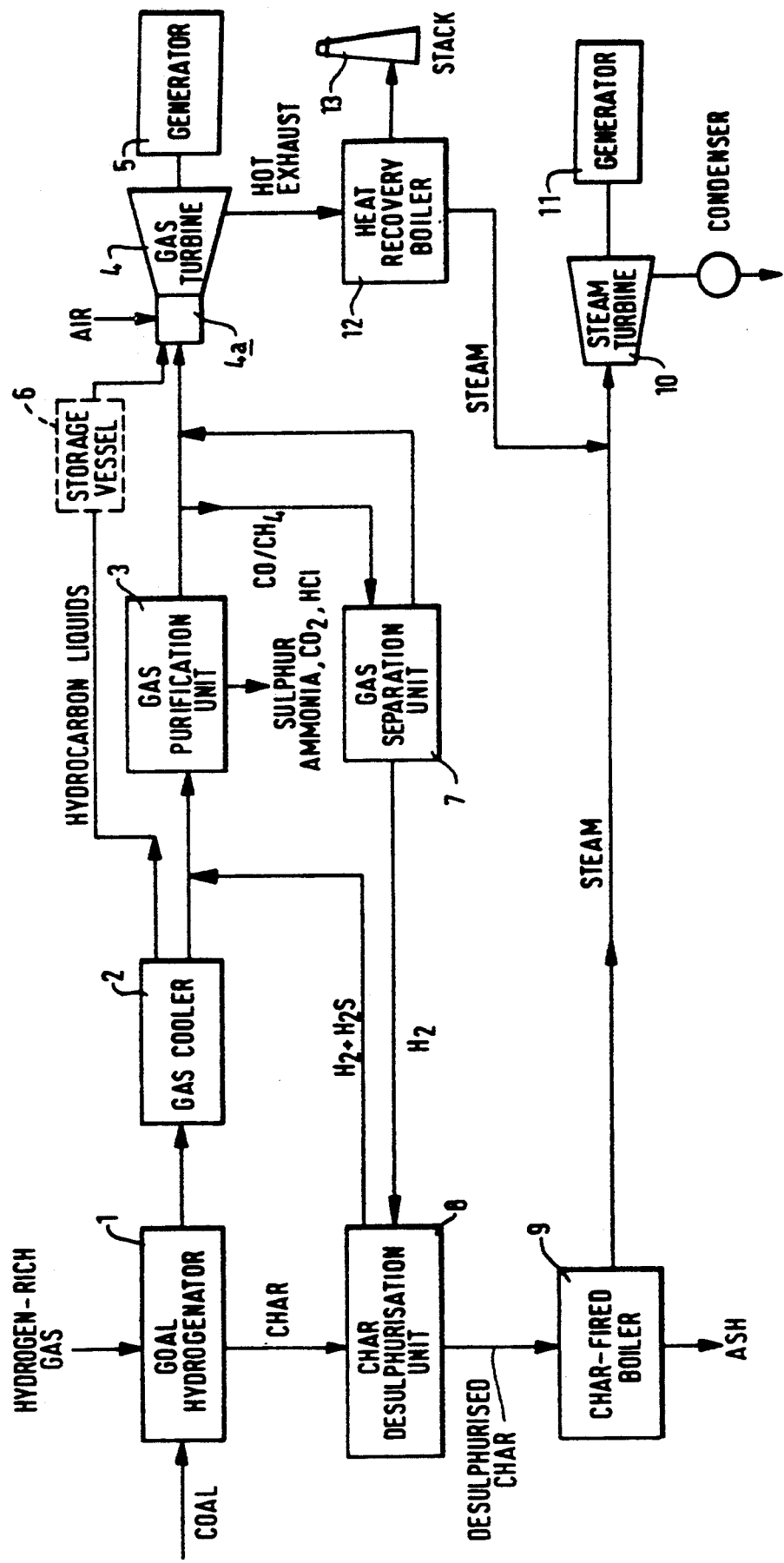

ELECTRICAL POWER GENERATION

The invention relates to electrical power generation and, more particularly, to a method for combined cycle electrical power generation.

An object of the invention is to provide such a method which utilises a coal hydrogenation process.

According to the invention a method for combined cycle electrical power generation comprises: introducing into a coal hydrogenator coal and a hydrogen-rich gas at an elevated temperature suitable for initiating and maintaining coal hydrogenation reaction; hydrogenating the coal with the hydrogen-rich gas in the hydrogenator to form a char and a first gaseous product; removing the char and removing the first gaseous product from the hydrogenator; cooling the first gaseous product to form a condensed liquid hydrocarbon product and a remaining gaseous product; separating the liquid hydrocarbon product from the remaining gaseous product; removing impurities from the remaining gaseous product; feeding at least a portion of the purified remaining gaseous product to the combustion chamber of a gas turbine to form gaseous combustion products to drive the turbine whereby the gas turbine drives a first electrical generator to produce electrical power; and introducing at least some of the char into a boiler and combusting the char therein with air to produce steam to drive a steam turbine whereby the steam turbine drives a second electrical generator to produce electrical power. One or more gas turbines may be driven by the combustion products and one or more steam turbines may be driven by the steam produced.

The purified remaining gaseous product may be separated into a first separated gas, which is a hydrogen-rich gas, and a second separated gas, which comprises methane and carbon monoxide, and wherein, prior to the char being introduced into the boiler, the char is contacted with the first separated hydrogen-rich gas to cause desulphurisation of the char. At least a portion of the second separated gas may be mixed with the purified remaining gaseous product portion being fed to the gas turbine(s).

Hydrogen sulphide and hydrogen-containing gases which result from the desulphurisation of the char may be separated from the desulphurised char and then mixed with the remaining gaseous product prior to the removal of impurities from the remaining gaseous product.

At least a portion of the liquid hydrocarbon product separated from the remaining gaseous product may be fed to the combustion chamber of a gas turbine to form gaseous combustion products to drive the gas turbine to drive an electrical generator to produce electrical power. This gas turbine may be the gas turbine, or one of the gas turbines, which is driven via the purified remaining gaseous product. Alternatively, the gas turbine driven via the liquid hydrocarbon product may be a separate turbine.

Some or all of the liquid hydrocarbon products may be stored and from store, as required, be used at times of increased or peak power demand. Such storage may avoid the need to purchase suitable liquid fuels or synthesise them. Optionally, liquid hydrocarbon products from such store may be sold as a fuel or chemical feedstock.

Hot exhausted combustion products from the, or any or the, gas turbines (whether utilising the purified remaining gaseous product or the liquid hydrocarbon products) may be passed through one or more waste heat boilers to produce further steam to drive one or more steam turbines to drive an electrical generator to produce electrical power. This or these steam turbines may be the, or one of the, steam turbines driven by steam produced by the combustion of the char, or alternatively the or each steam turbine driven by steam from the waste boiler(s) may be a separate turbine.

From the above it will be appreciated that electrical power can be generated usefully from liquid, gaseous and char products produced by the coal hydrogenator.

Although new plant may be constructed to perform the invention, the method or process scheme described above is considered to be particularly suitable for 'retrofitting' to an existing coal-fired power station. It is envisaged that the char could be fed to an existing coal-fired boiler with only relatively minor modifications to the burners and fuel supply system being required. With such a retrofit the power output could be maintained or increased. Moreover, unlike the case with schemes based on coal gasification processes in which substantially all of the coal is converted directly into gaseous products, this retrofit enables a considerable proportion of the total power output to be generated by utilising known boiler/steam turbine technology with which the operators may be most familiar.

In order that the invention may be more readily understood, reference will now be made, by way of example, to the accompanying drawing which is a schematic diagram illustrating the method of the invention.

Referring to the drawing, coal and hydrogen-rich gas, at an elevated pressure and an elevated temperature suitable for initiating and maintaining coal hydrogenation reactions, are introduced into a coal hydrogenator 1 wherein the coal is hydrogenated by the hydrogen-rich gas at an elevated temperature to form a char and a first gaseous product. The char and the first gaseous product are removed from the hydrogenator 1. The first gaseous product is passed to a gas cooler 2 where a condensed liquid hydrocarbon product and a remaining gaseous product are formed from the first gaseous product. This remaining gaseous product leaving the gas cooler 2 is passed through a gas purification unit 3 where impurities such as hydrogen sulphide, carbon dioxide, hydrogen chloride and ammonia are removed. At least a portion of the purified gaseous product which comprises methane, carbon monoxide and hydrogen and exits from the gas purification unit 3 is fed to a gas turbine 4 where it is combusted with air in the combustion chamber 4a of the turbine 4 to form gaseous combustion products to drive the turbine which in turn drives a first electrical generator 5 to produce electrical power.

The liquid hydrocarbon product, which would typically comprise a mixture of aromatic hydrocarbons, may also be fed to the combustion chamber 4a and combusted therein with air to form further gaseous combustion products to drive the turbine.

Alternatively, the liquid hydrocarbon product may be fed to a storage vessel 6 from which the liquid may be drawn as required and fed to the combustion chamber 4a.

A further portion of the purified gaseous product exiting from the purification unit 3 may be passed to a gas separation unit 7 wherein the gaseous product is separated into a first separated gas which is a hydrogen-rich gas (i.e. at least 50% wt/wt hydrogen) and into a second separated gas which comprises methane and carbon monoxide.

While still under an elevated pressure and at hydrogenator exit temperature, the char is fed from the hydrogenator 1 into a desulphurisation unit 8 in which a bed of the char may be held for an average period of 1 to 20 minutes at a temperature of 750 to 900° C. and a pressure of at least 20 bar while the first separated hydrogen-rich gas is passed through the bed to cause desulphurisation of the char. The temperature may conveniently be maintained, if desired, by injecting small quantities of air or oxygen to induce combustion of part of the hydrogen-rich gas. The char is then cooled and reduced in pressure (and optionally stored) before being used as described below.

The second separated gas, from the separation unit 7, which comprises methane and carbon monoxide is mixed with that portion of the purified remaining gaseous product being fed to the gas turbine 4.

As a result of the char desulphurisation, hydrogen sulphide and hydrogen-containing gases are formed and these gases are separated from the desulphurised char and are mixed with the gaseous product exiting from the gas cooler unit 2 and prior to introduction into the gas purification unit 3.

At least a portion of the desulphurised char from the desulphurisation unit 8 is fed to a char-fired boiler 9 where the char is combusted with -air to produce steam which drives a steam turbine 10 which in turn drives a second electrical generator 11 to produce electrical power.

Hot gaseous combustion products are exhausted from the gas turbine 4 and are passed through a waste heat or heat recovery boiler 12 to produce further steam which drives the steam turbine 10 which in turn drives the electrical generator 11.

Waste gaseous flue products from the boiler 12 are led away to the stack 13 without further clean up.

The coal feed to the hydrogenator 1 may be prepared by drying and grinding to an appropriate size range to suit the hydrogenation process. The hydrogen-rich gas feed to the hydrogenator may be provided by a known means from outside sources, by converting part of the gas or liquid products using known steam reforming or partial oxidation processes, or by steam-oxygen gasification of part of the char product using known methods. In all of these cases, the resulting gas mixtures may be purified and upgraded by known methods. The resulting hydrogen-rich gas may be preheated to the required hydrogenator inlet temperature by known means such as by heat exchange with the hot gas product leaving the coal hydrogenator.

Any unreacted hydrogen contained in the gases exiting from the purification unit 3 may, optionally, be recovered by known means for recycle to the hydrogenator 1.

The use of coal hydrogenation in the scheme described above is advantageous because both char and liquid fuels can be produced which contain sufficiently low amounts of sulphur, nitrogen and chlorine (which are all precursors of 'acid rain' emissions) that a high reduction of 'acid rain' emissions is already achieved without the need for disadvantageous and expensive downsteam treatment of the flue gases, such as NOX removal and desulphurisation. In the process described above contaminants (including S, N and Cl) are removed in a chemically reduced form into the product gas stream, from which they may be economically removed to lower levels using a variety of known gas treating processes. The equipment may be made compact because of high operating pressures (leading to small gas volume) and very rapid reaction rates in hydrogen.

Applicants investigations have shown that a hydrogenation process based on that described in published UK patent application No. 2121426 A is particularly advantageous for the hydrogenation step in the present scheme because:
  a) high efficiency can be achieved with the process,
  b) controlled quantities of clean hydrocarbon liquid fuel products can be produced without the use of extreme operating conditions,
  c) a combination of hydrogenator arrangement and operating conditions can be employed which has been found to lead to
  a very low level of S, N and Cl containing contaminants in both the char and the liquid products; typically, the levels of removal of S, N and Cl are: S—70 to 85%, N—45 to 55%, Cl—90 to 95% (and by using the additional char desulphurisation step—see unit 8 in drawing—it has been found that the removal of S may be increased to 90% or more),
  a char which is both particularly combustible (and therefore particularly suitable for feed to the char-fired boiler 9) and very reactive towards further rapid desulphurisation in an atmosphere containing hydrogen at elevated pressures ( as in unit 8)
  and a liquid product which is of low boiling range and low viscosity and thus readily combustible as a gas turbine or boiler fuel, or valuable as a product for fuel or chemical uses, and
  d) the use of a conventional size grade of coal, known as pulverised fuel, results in a char with a suitable size range for use in conventional boilers designed for pulverised fuel firing and especially useful in a retrofit situation.

Applicants investigations into the use of the coal hydrogenation process described in UK 2121426 A but using nitrogen and not hydrogen as the coal transport gas, have indicated that good yields of high quality liquids, representing up to about 18% of the carbon content of the coal, can be obtained at convenient and efficient operating conditions of: pressures above 20 bar; reaction times of 5 to 50 seconds; temperatures of 750 to 870° C.; and a gas recirculation ratio of 2 to 10 vol/vol. It has been found that these conditions lead to good thermal efficiency and less severe duty for materials of construction of the hydrogenator. It is believed that this is due to the beneficial effects of the internal recirculation of gas in this reaction process which stabilises the conversion process at these milder conditions. It has also been found that the hydrocarbon liquids produced are lighter, more volatile and less viscous in nature and substantially free of troublesome heavy residual or 'pitch' fraction which can result from other thermal coal conversion processes, such as coke ovens (carbonisation) or coal liquefaction. In particular, Applicants investigations have shown that the hydrocarbon liquids produced in their process can contain 30 to 90% of valuable benzene.

We claim:
1. A method for combined cycle electrical power generation comprising
  (i) introducing into a coal hydrogenerator coal and a hydrogen-rich gas at an elevated temperature suitable for initiating and maintaining coal hydrogen- eration reaction, hydrogenating the coal with a hydrogen-rich gas in the hydrogenerator to form a char and a first gaseous product; removing the char and removing the first gaseous product from the hydrogenerator;

(ii) cooling the first gaseous product to form a condensed liquid hydrocarbon product and a remaining gaseous product; separating the liquid hydrocarbon product from the remaining gaseous product;

(iii) removing impurities from the remaining gaseous product;

(iv) feeding at least a portion of the purified remaining gaseous product to the combustion chamber of a gas turbine to form gaseous combustion products to drive the turbine whereby the gas turbine drives a first electrical generator to produce electrical power;

(v) and introducing at least some of the char into a boiler and combusting the char therein with air to produce steam to drive a steam turbine whereby the steam turbine drives a second electrical generator to produce electrical power, wherein a portion of the purified remaining gaseous product is separated into a first separated gas, which is a hydrogen-rich gas, and a second separated gas, which comprises methane and carbon monoxide, and wherein, prior to the char being introduced into the boiler, the char is contacted with the first separated hydrogen-rich gas to cause desulphurisation of the char.

2. A method as claimed in claim 1, in which at least a portion of the second separated gas is mixed with the purified remaining gaseous product portion being fed to the gas turbine.

3. A method as claimed in claim 1 or 2, in which hydrogen sulphide and hydrogen-containing gases resulting from the desulphurisation of the char are separated from the desulphurised char and are mixed with the remaining gaseous product prior to the removal of impurities from the remaining gaseous product.

4. A method as claimed in claim 1, in which at least a portion of the liquid hydrocarbon product separated from the remaining gaseous produced is fed to the combustion chamber of a gas turbine to form gaseous combustion products to drive the gas turbine to drive an electrical generator to produce electrical power.

5. A method as claimed in claim 1 in which hot exhausted combustion products from the, either or each gas turbine are passed through one or more waste heat boilers to produce further steam to drive one or more steam turbines to drive an electrical generator to produce electrical power.

* * * * *